United States Patent [19]

Cooke et al.

[11] Patent Number: 5,062,456
[45] Date of Patent: Nov. 5, 1991

[54] KINK-RESISTANT, SMALL BEND RADIUS HOSE WITH POLYFLUOROCARBON LINER

[75] Inventors: Horise M. Cooke, Weatherford; Richard F. Deiss, Arlington, both of Tex.

[73] Assignee: Parker-Hannifin Corporation, Cleveland, Ohio

[21] Appl. No.: 488,334

[22] Filed: Mar. 2, 1990

[51] Int. Cl.⁵ .................... B67L 11/02; B67L 11/08
[52] U.S. Cl. ................ 138/125; 138/DIG. 1; 138/DIG. 3; 138/127; 138/133
[58] Field of Search .......... 138/124, 125, 129, 133, 138/140, 141, 144, 137, 126, 127, DIG. 1, DIG. 3; 156/143, 245, 149, 153; 428/35.7, 36.1, 36.9, 36.91, 36.8

[56] References Cited
U.S. PATENT DOCUMENTS

| Re. 32,230 | 8/1986 | Satoh et al. | 138/DIG. 3 |
|---|---|---|---|
| 2,828,236 | 3/1958 | West | 138/DIG. 3 |
| 3,805,848 | 4/1974 | Chrow | 138/137 |
| 3,913,625 | 10/1975 | Gazda et al. | 138/140 |
| 3,944,453 | 3/1976 | Chudgar et al. | 156/143 |
| 4,104,095 | 8/1978 | Shaw | 156/149 |
| 4,398,989 | 8/1983 | Allen et al. | 156/245 |
| 4,459,168 | 7/1984 | Anselm | 156/143 |
| 4,588,461 | 5/1986 | Braun | 156/143 |
| 4,706,712 | 11/1987 | Oglesby et al. | 138/137 |
| 4,800,109 | 1/1989 | Washizu | 138/137 |
| 4,880,036 | 11/1989 | Kitami et al. | 138/125 |
| 4,952,262 | 8/1990 | Washkewicz et al. | 156/149 |

Primary Examiner—Daniel M. Yasich
Attorney, Agent, or Firm—Christopher H. Morgan

[57] ABSTRACT

A kink-resistant, small bend radius hose has a thin layer polyfluorocarbon liner tube with a thickness in the range of from about 0.005 inches to about 0.025 inches. The exterior of the liner tube is etched to allow silicone to be bonded thereto. A thin layer of silicone is bonded to the etched exterior of the liner tube. This layer of silicone serves as a bonding layer for a reinforcing layer of synthetic fabric, a helix strand and a cover layer. The reinforcing layer serves to strengthen the thin liner tube, the helix strand serves to support the hose against kinking and the cover layer adds additional strength and contains the helix strand with respect to the reinforcing fabric. Thus, a composite, integral, kink-resistant, small bend radius hose is achieved.

10 Claims, 1 Drawing Sheet

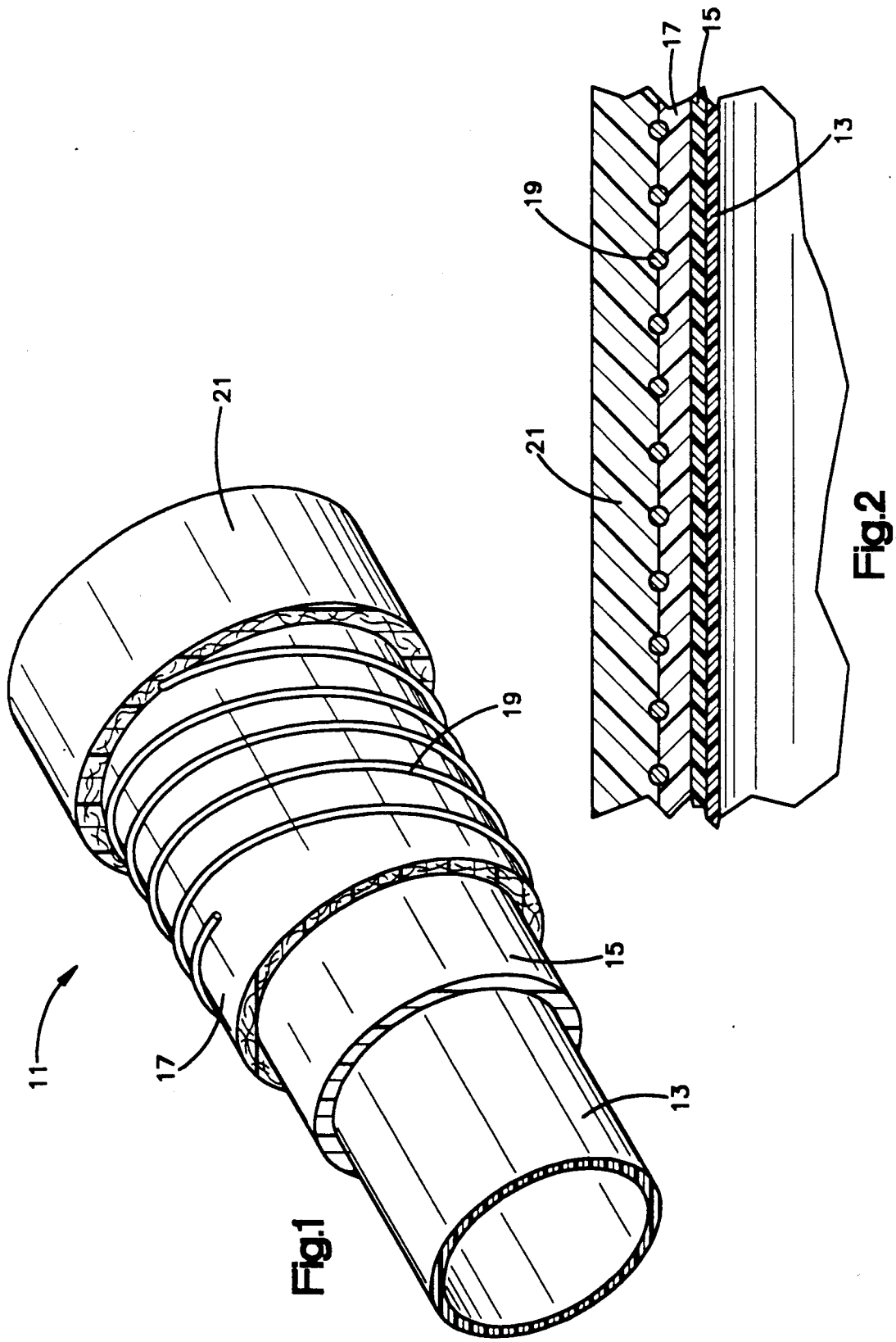

KINK-RESISTANT, SMALL BEND RADIUS HOSE WITH POLYFLUOROCARBON LINER

BACKGROUND OF THE INVENTION

1. Field of the Invention

This invention relates in general to hoses of the type used to transport potable water and more particularly to a novel kink-resistant potable water hose with a polyfluorocarbon liner.

2. Description of the Prior Art

Hoses which use silicone or vinyl as the inner tube material have been found unsuitable in many potable water uses because the water carried therein can attain high levels of chlorine. These high levels of chlorine added to the potable water may leach compounds and elements from the tube material. The increased chlorine and leached material often causes the water to be unpalatable. In addition, in the case of a silicone inner tube, a residue of the silicone can cause an oil-like residue on the surface of hot drinks. This is also unappetizing and unappealing. Accordingly, while silicone and vinyl tube constructions provide strength and flexibility, their use as a conduit is aesthetically unsatisfactory in many potable water uses.

Potable water lines which use an inner tube made from a polyfluorocarbon such as polytetrafluoroethylene (PTFE) do not affect the taste of the water. PTFE is an inert material and provides a means of transporting both hot and cold potable water without degrading the taste. However, potable water lines made with a PTFE inner tube have, heretofore, been difficult to install or service due to kinking or collapsing in bending. This is especially true where small bend radius tubing is needed for the potable water application. For example, in potable water lines used in commercial aircraft, it is desirable to have a small bend radius and this exacerbates the kinking and bending problem present in prior art PTFE potable water lines.

The conventional means for resolving a kinking, bending problem in hose is to increase the thickness of the tubing or to add a helically wound reinforcement wire. However, this has not been possible in PTFE tubing of the prior art since increasing the thickness of the PTFE inner tube makes the tube more rigid and less able to meet the bend radius requirements. A thicker PTFE inner tube also makes connection and servicing more difficult. It is also not possible using conventional methods to reinforce the PTFE inner tube with a helically wound wire. This is because the PTFE tubing resists bonding of a reinforcement wire to the tube.

Another problem with conventional PTFE potable water lines is the requirement that the potable water lines pass performance tests including repeated freezing. In order to pass these repeated freezing performance tests conventional PTFE hoses utilized especially thick PTFE inner tubes and, therefore, the tubing was unable to pass the small bend radius requirements. Still further, PTFE tubing which is reinforced with wire must be thicker in order not to be damaged during the repeated freezing tests and this also adds to the problem of bending and kinking. In summary, potable water lines constructed with a conventional PTFE inner tube have been comparatively rigid and easily kinked.

Still another problem with potable water tubing of the type used in commercial aircraft is the requirement that the tubing be able to be easily drained. This requires that the hose be sufficiently sturdy when freely resting on transverse supports spaced at a predetermined distance so as not to sag to create a captured pocket of water. This resistance to sagging conventionally required a PTFE tubing which was thicker and, therefore, less able to meet the requirements for small bend radius.

It is accordingly an object of the present invention to provide an improved hose with a polyfluorocarbon liner. More particularly, it is an object of the present invention to provide a kink-resistant, small bend radius hose with a polyfluorocarbon liner of the type suitable for use with potable water.

It is also an object of the present invention to provide a potable water hose with a polyfluorocarbon liner which has a small bend radius, is kink-resistant, is more resistant to sag, and which is capable of repeated freezing of the water therein without causing damage to the tube.

SUMMARY OF THE INVENTION

In accordance with these objects the present invention provides a kink-resistant, small bend radius hose with a polyfluorocarbon liner. The hose includes a polyfluorocarbon liner tube with a thickness of from about 0.005 inches to about 0.025 inches. The polyfluorocarbon liner tube has an exterior which is etched to allow silicone to be bonded thereto. A layer of silicone is bonded to the etched exterior of the polyfluorocarbon tube in a layer which is sufficiently thick to allow a reinforcing fabric to be bonded thereto. A layer of silicone impregnated reinforcing fabric is bonded to the layer of silicone for reinforcing the polyfluorocarbon tube. A helix strand is wound helically about the layer of reinforcing fabric for protecting the hose against kinking. A cover layer is bonded to the reinforcing fabric to contain the helix strand with respect to the reinforcing fabric. In this manner, a thin polyfluorocarbon liner tube is bonded to a reinforcing fabric to form an integral, strong tube and a helix strand to protect against kinking is helically wound about the reinforcing fabric and held with respect thereto. This results in a strong, kink-resistant, small bend radius, flexible, potable water hose with a polyfluorocarbon liner. This hose is sufficiently strong to pass the freeze tests, sag tests and other tests required of potable water hose used in commercial aircraft while providing all of these improved characteristics.

Preferably the reinforcing fabric and the cover layer are both formed of polyester fabric impregnated with silicone. Also preferably the helix strand is formed of a corrosion-resistant steel wire which has a diameter of from about 0.010 inches to about 0.060 inches. The wire is helically wound on the reinforcing fabric in a linear density of from about 2 to about 8 turns per inch. Tubing of this type has an inner diameter from about 0.25 inches to about 1.5 inches.

For a further understanding of the invention and further objects, features and advantages thereof, reference may now be had to the following description taken in conjunction with the accompanying drawings.

DESCRIPTION OF THE DRAWINGS

FIG. 1 is a layered cutaway perspective view of a hose constructed in accordance with the present invention.

FIG. 2 is a longitudinal cross sectional view of a portion of the hose shown in FIG. 1.

DESCRIPTION OF PREFERRED EMBODIMENTS

Referring now to FIGS. 1 and 2 a composite hose constructed in accordance with the present invention is shown generally at 11. FIG. 1 shows a perspective view with the five layer elements of the hose 11 shown telescoped or layered. FIG. 2 shows the hose 11 in a closeup, longitudinal cross sectional view through the wall of the hose 11.

The hose 11 includes an inner tube 13, a bonding layer 15., a reinforcing layer 17, a helical strand 19 and a cover layer 21. Each of these elements 13 through 21 is bonded to form an integral, composite hose assembly.

The hose 11 is designed for use in carrying potable water and is specially adapted for use where small bend radius hose is needed, for example, potable water hose used on a commercial aircraft. For such use, it is necessary that the inner tube 13 be constructed of a polyfluorocarbon material. Such material includes polytetrafluoroethylene (PTFE), polytrifluoroethylene, tetrafluoroethylene/hexafluoroethylene copolymers, poly (fluoroethylene/ethylene) and poly (fluoroethylene/propylene) copolymers, polychlorotrifluoroethylene, poly (chlorotrifluoroethylene/ethylene) copolymers, and the like. Preferred among these is PTFE since PTFE is easily extruded into tubing, has a high melt temperature and can be acid etched for chemical bonding to silicone.

In order that the tubing of the present invention have a small bend radius it is necessary that the inner PTFE tube 13 have a relatively thin wall or thickness. A suitable range of thickness for the PTFE tube 13 is from about 0.005 inches to about 0.025 inches. More preferred is from about 0.010 inches to about 0.025 inches thick. Still more preferred is from about 0.010 inches to about 0.020 inches thick with 0.0175 inches thick being most preferred. This thickness allows an easily extruded tubing 13 to be formed while maintaining the thickness as thin as reasonably possible.

With the PTFE tube 13 so thin, it is necessary that a reinforcing material or layer 17 be attached or bonded to it. This is achieved by the bonding layer 15. The bonding layer 15 is a layer of silicone which is chemical/mechanical bonded to the exterior of the tubing 13 after the exterior of the tubing 13 has been etched to provide a bonding surface for the layer of silicone. Etching of the exterior of the PTFE tube 13 may be accomplished by mechanical methods, oxidizing flames, corona discharge, oxidizing acid baths or other chemical baths. Chemicals that may be used in the etching process include but are not limited to, acid solutions of metallic sodium. It is thought that chemical etching is the preferred method for providing the best PTFE to silicone bond. Such chemical etching is available commercially and is well known in the art.

Once the exterior of the PTFE tube 13 has been etched, the silicone bonding layer 15 is chemical/mechanical bonded thereto. This bonding is also well known in the art. To achieve the small bend radius desired for the present invention, it is necessary that this bonding layer be relatively thin. The silicone bonding layer is preferably from about 0.005 inches to about 0.025 inches thick. More preferably the silicone layer is from about 0.010 inches to about 0.020 inches thick.

Bonding of the silicone layer 15 to the PTFE tube 13 produces a 100% surface-to-surface contact of the PTFE and silicone. The silicone layer 15 which is bonded to the PTFE tube 13 provides the transition to the reinforcement and integrates the PTFE tube into the total construction of the hose 11.

Thus, the composite, thin wall PTFE tube 13 and silicone layer 15 provide the foundation for the reinforcement layer 17, the helical strand 19 and the cover layer 21 with all the advantages of a thin wall PTFE inner tube.

After extruding the PTFE inner tube 13 and etching the outer surface, a mandrel is inserted in he tube 13 in preparation for adding the silicone layer 15 and the outer layers 17 through 21. First, the silicone layer 15 is chemically bonded to the exterior of the tube 13. Then the reinforcement layer 17 is applied to the exterior of the silicone bonding layer 15. Then the helix strand 19 is helically wound about the reinforcement layer 17. Finally, the cover layer 21 is applied about the exterior of the reinforcement layer 17 sandwiching the helically wound helix stand 19 between the interior of the cover layer 21 and the exterior of the reinforcement layer 17. To achieve complete bonding of the layers 15 through 21 the entire assembly can be placed in an autoclave for vulcanization. Conditions for vulcanization of silicone layers of the type described is well know to those skilled in the art.

The reinforcement layer 17 provides a resilient strength to the thin layers 13 and 15 inside it. A reinforcing fabric is ideal for this resilient strength. Preferably silicone impregnated polyester fabric is used since this material has all of the properties needed and can be easily bonded to the silicone layer 15 by vulcanization. Other fabric materials which could be utilized are Nylon ®, Kevlar ® and Nomex ®.

The reinforcing fabric layer 17 is preferably bias wrapped at approximately 45° to the axis of the tubing to provide a maximum flexible reinforcement to the tubing. Of course, it is not necessary to actually wrap the fabric at a bias since the fabric can be cut on the bias prior to its application to the tubing.

The helical strand 19 importantly allows the tubing to have a small bend radius while avoiding kinking. The helical stand 19 supports the tubing in an extreme bend against collapsing. The helical strand 19 is preferably a corrosion resistant metal such as stainless steel coated with copper or bronze to increase its bondability to layers 17 and 21. The helical stand 19 preferably has a diameter in the range of from about 0.010 inches to about 0.060 inches depending upon the size of the tubing and the resistance to kinking preferred. More preferred is a helical stand diameter in the range of from about 0.025 inches to about 0.045 inches.

Also depending upon the size of the tubing the helical strand 19 is helically wound to a linear density of from about 2 to about 8 turns per inch. Of course, more turns per inch are needed on a smaller size tubing in order to provide the same protection against kinking during an extreme bend.

The cover layer 21 contains the helix stand 19, helps to bond the helix stand 19 to the reinforcing layer 17 and provides further reinforcement to the inner tube 13. It also provides abrasion and wear protection. Of course, it must be able to be bonded to the reinforcing layer 17. All of these features are achieved by a silicone impregnated synthetic fabric such as polyester which is most desirable. Other suitable fabrics are fabrics formed of Nylon ®, Kevlar ® and Nomex ®. These synthetic fabric materials provide flexible strength.

As with the reinforcing layer fabric 17 it is preferred that the fabric of the cover layer 21 be bias wrapped at a bias of approximately 45° to provide maximum flexibility and reinforcement.

Both the reinforcing fabric 17 and the cover layer fabric 21 preferably have a thickness in the range of from about 0.010 to about 0.030 inches. This provides sufficient strength while remaining sufficiently flexible for the small bend radius required.

An integral, composite hose constructed as described above will have a very small bend radius. For example, such hose will have a bend radius which is smaller than 2 to 3 times the hose diameter (outer diameter). This hose will withstand repeated freezings of water contained therein and is usable form −65° F. to 275° F. This hose also avoids sagging while maintaining its small bend radius and kink resistance. All of this is achieved with a very thin PTFE inner tube.

Thus, the present invention is well adapted to achieve the objects and advantages mentioned as well as those inherent therein. The above discussion of this invention is directed primarily to preferred embodiments and practices thereof. Its will be readily apparent to those skilled in the art that further changes and modification in the actual implementation of the concepts described herein can be made without departing from the spirit and scope of the invention as defined by the appended claims.

What is claimed is:

1. A kink-resistant, small bend radius hose with a polyfluorocarbon liner comprising:
    said polyfluorocarbon liner being a polyfluorocarbon liner tube with a thickness of from about 0.005 inches to about 0.025 inches; said tube having an exterior which is etched to allow silicone to be bonded thereto;
    a layer of silicone bonded to said etched exterior of said polyfluorocarbon tube; said layer of silicone being sufficiently thick to allow a silicone impregnated reinforcing fabric to be bonded thereto;
    said layer of silicone impregnated reinforcing fabric bonded to said layer of silicone for reinforcing said polyfluorocarbon tube;
    a helix strand wound helically about said layer of reinforcing fabric for protecting said hose against kinking; and
    a cover layer bonded to said reinforcing fabric to contain said helix strand with respect to said reinforcing fabric, whereby the combination of said polyfluorocarbon liner tube, said layer of silicone, said reinforcing fabric, said helix strand, and said cover layer form a reinforced hose which is capable of bending to a small bend radius while resisting kinking.

2. The hose of claim 1 wherein said layer of silicone is from about 0.005 to about 0.025 inches thick.

3. The hose of claim 2 wherein said reinforcing fabric comprises a polyester fabric.

4. The hose of claim 3 wherein said cover layer comprises a silicone impregnated polyester fabric.

5. The hose of claim 4 wherein said layer of silicone impregnated reinforcing fabric is from about 0.010 to about 0.030 inches thick.

6. The hose of claim 5 wherein said helix strand comprises corrosion resistant steel wire.

7. The hose of claim 6 wherein said helix strand has a diameter of from about 0.010 inches to about 0.060 inches.

8. The hose of claim 7 wherein said helix strand is helically wound on said reinforcing fabric in a linear density of from about 2 to about 8 turns per inch.

9. The hose of claim 8 wherein said polyfluorocarbon tube liner has an inner diameter of from about 0.25 inches to about 1.5 inches.

10. The hose of claim 9 wherein said polyfluorocarbon tube liner comprises polytetrafluoroethylene.

* * * * *